United States Patent [19]

Burgio

[11] Patent Number: 5,989,033
[45] Date of Patent: Nov. 23, 1999

[54] BOOK KIT FOR A DRAWING GAME-FUN SKY

[76] Inventor: Patricia Burgio, 6306 S. Whitham Dr., Niagra Falls, N.Y. 14304

[21] Appl. No.: 09/069,997

[22] Filed: Apr. 30, 1998

Related U.S. Application Data

[60] Provisional application No. 60/068,752, Dec. 24, 1997.

[51] Int. Cl.$^6$ .............................. G09B 11/04; G09B 19/00
[52] U.S. Cl. ........................ 434/88; 434/85; 434/217; 434/261
[58] Field of Search ................ 434/261, 85, 88, 434/217; 281/15.1, 27.1, 38; 283/63.1; 402/79

[56] References Cited

U.S. PATENT DOCUMENTS

| | | |
|---|---|---|
| 135,315 | 1/1873 | Boucher . |
| 333,483 | 12/1885 | Stewart . |
| 491,160 | 2/1893 | Cross . |
| 1,041,435 | 10/1912 | Cross . |
| 1,282,382 | 10/1918 | Cross . |
| 1,421,975 | 7/1922 | Meyers . |
| 2,075,529 | 3/1937 | Leubrie ........................ 434/88 |
| 2,427,612 | 9/1947 | Lobb . |
| 2,629,382 | 2/1953 | Gomez ........................ 402/19 |
| 3,492,743 | 2/1970 | Schmidt . |
| 3,581,882 | 6/1971 | Bish ........................ 206/1.7 |
| 3,889,397 | 6/1975 | Flood ........................ 435/16 |
| 4,008,529 | 2/1977 | Yorkston ........................ 434/322 |
| 4,115,937 | 9/1978 | Wolpert ........................ 434/395 |
| 4,439,159 | 3/1984 | Hunter . |
| 4,498,238 | 2/1985 | Vaughn . |
| 5,022,682 | 6/1991 | Desmond ........................ 281/38 |
| 5,080,590 | 1/1992 | Frisque ........................ 434/88 |
| 5,137,453 | 8/1992 | Hudson . |
| 5,178,542 | 1/1993 | Chigrinsky ........................ 434/157 |
| 5,217,376 | 6/1993 | Gosselin . |
| 5,358,407 | 10/1994 | Lainer ........................ 434/94 |
| 5,409,381 | 4/1995 | Sundberg ........................ 434/159 |
| 5,411,344 | 5/1995 | Gagne ........................ 401/202 |
| 5,430,965 | 7/1995 | Lai . |
| 5,435,240 | 7/1995 | Fromm ........................ 101/33 |
| 5,580,250 | 12/1996 | McKewen . |
| 5,639,240 | 6/1997 | Werzberger ........................ 434/88 |
| 5,743,730 | 4/1998 | Clester ........................ 433/26 |

FOREIGN PATENT DOCUMENTS

| | | | |
|---|---|---|---|
| 2128937 | 5/1984 | United Kingdom | 434/88 |

*Primary Examiner*—Robert A. Hafer
*Assistant Examiner*—Kurt Fernstrom
*Attorney, Agent, or Firm*—Fisher, Christen & Sabol

[57] ABSTRACT

A book kit for a drawing game which includes a book and a pen. The book has a front cover page which has a series of holes located along one edge thereof and a back cover page which has a series of holes located along one edge thereof. Such edge corresponds to the edge of the front cover page. A number of internal pages located between the front cover page and the back cover page. The internal pages each have a series of holes located along one edge thereof. The internal pages are transparent pages alternated with non-transparent pages. One side of each of the non-transparent internal pages contains a photograph or print of clouds in the sky. There is a binder which is a metal or plastic spiral or which has pliable prongs which extend through the holes along the side of the front cover page, the back cover page and the internal pages. The binder has a lateral cross-section which is round and has a central longitudinal passageway. A pocket is located on the internal face of the back cover page. The pen can be inserted at least partially into the central longitudinal passageway of the binder or it can be otherwise packaged with the book in, for example, shrink wrapping or other packaging material. The pen can be used to write on the transparent pages of the internal pages whereby outlines can be drawn of animate and inanimate objects observed or perceived to be the clouds shown on the adjacent, facing side of one of the printed pages.

6 Claims, 5 Drawing Sheets

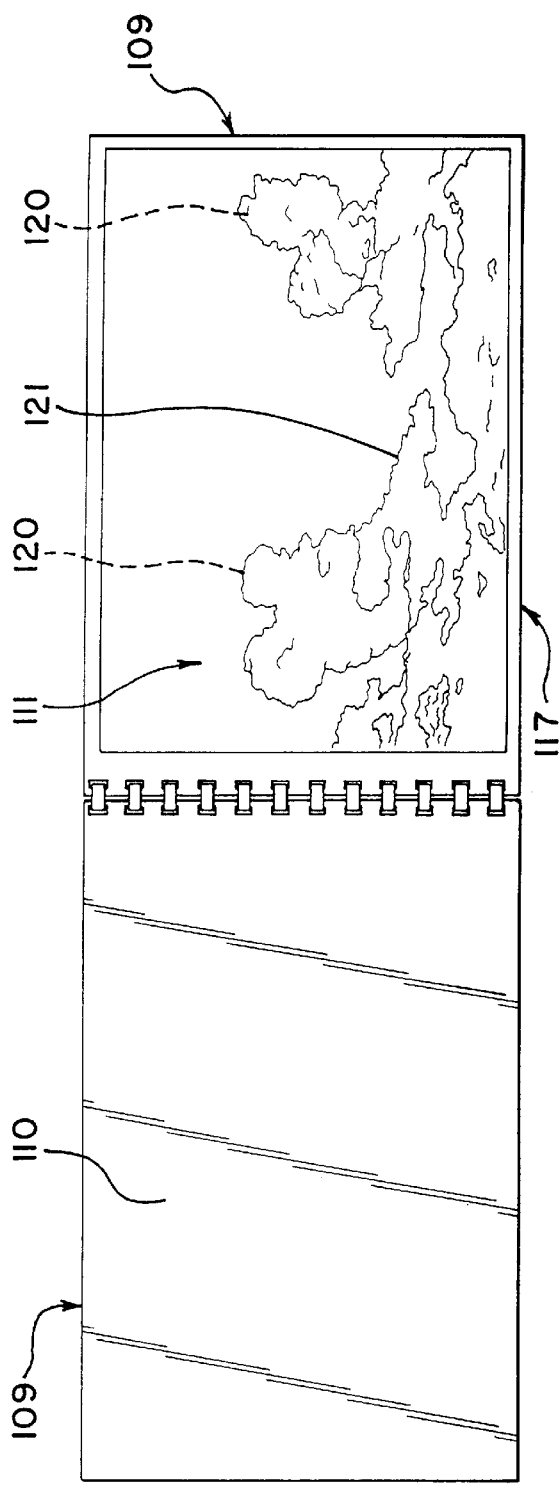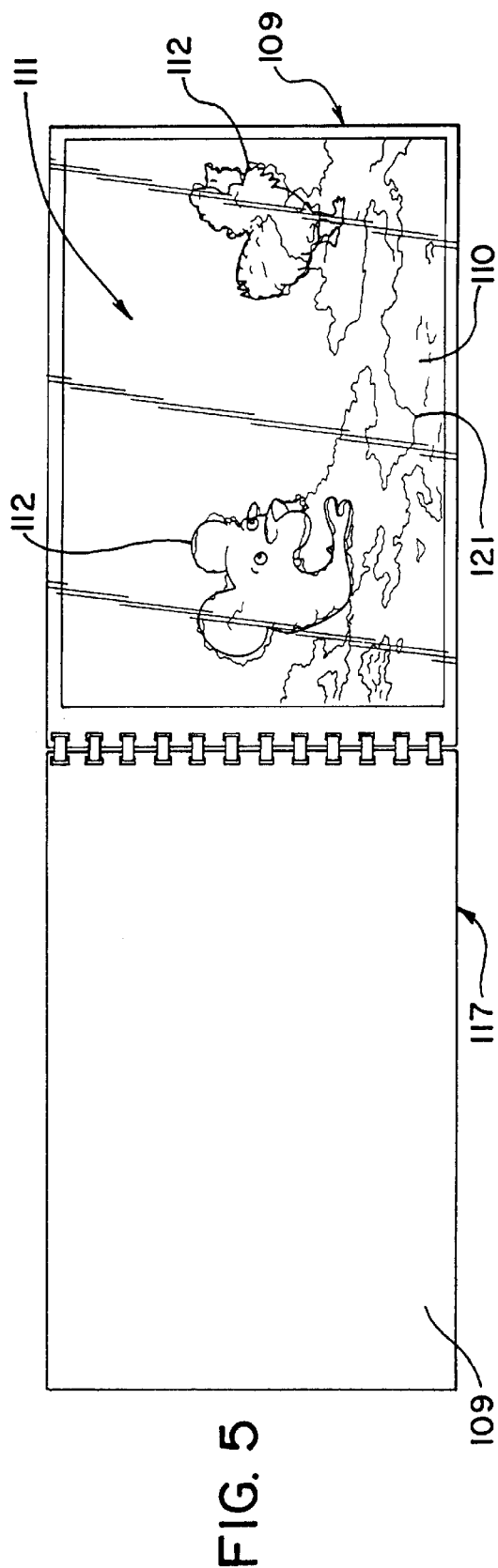

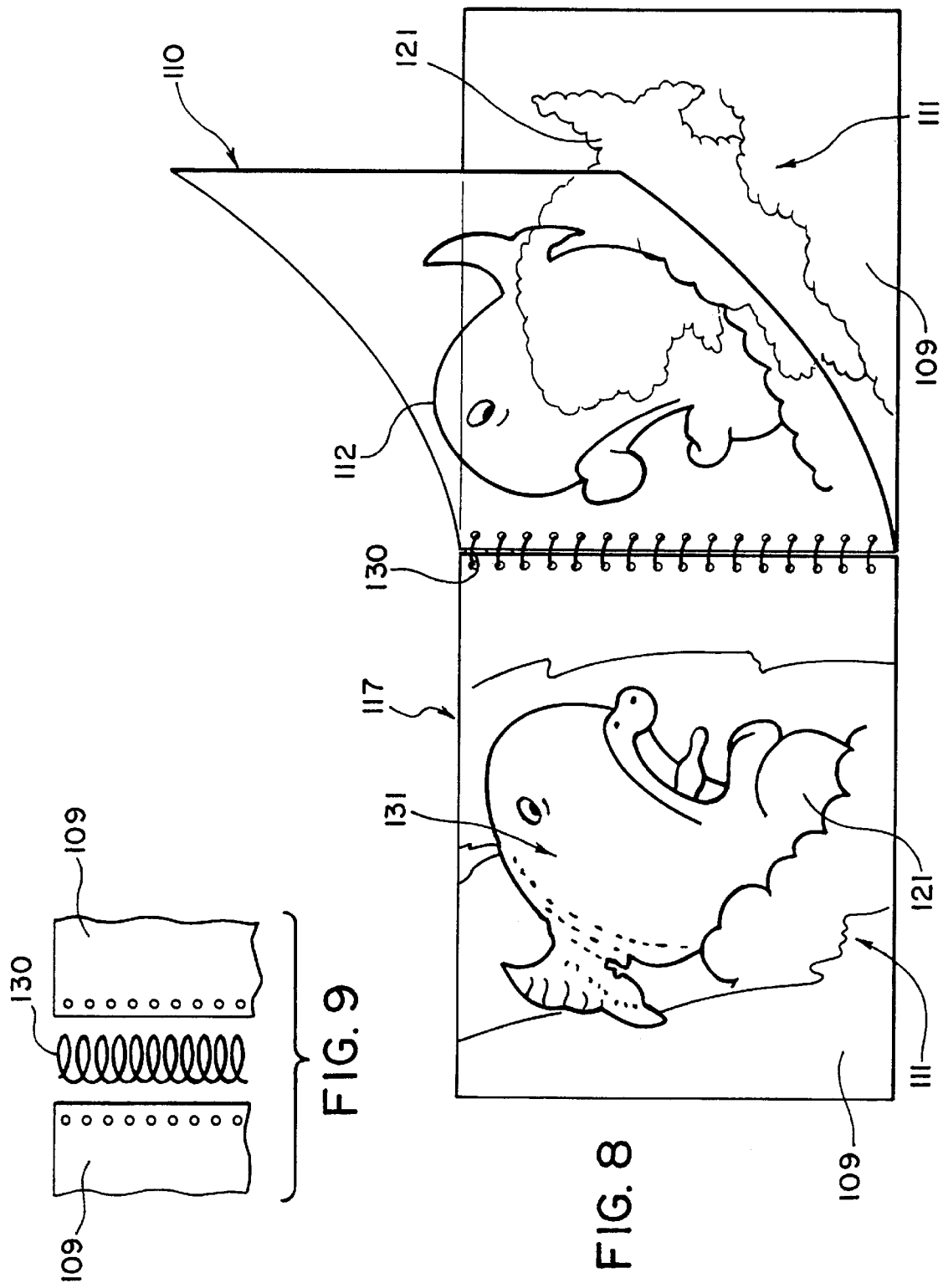

BOOK KIT FOR A DRAWING GAME-FUN SKY

This application claims benefit of Provisional Appl. Ser. No. 60/068,752, filed Dec. 24, 1997.

BACKGROUND OF THE INVENTION

1. Field of the Invention

The invention relates to a book kit for a drawing game and a process of using the book kit. The invention also relates to a set of flash cards and a process of using the set of flash cards.

2. Background Art

Attention is drawn to U.S. Pat. Nos. 135,315, 333,483, 491,160, 1,041,435, 1,282,382, 1,421,975, 2,143,608, 2,427,612, 2,918,732, 3,492,743, 4,439,159, 4,498,238, 5,137,453, 5,217,376, 5,430,964 and 5,580,250.

BROAD DESCRIPTION OF THE INVENTION

The invention involves a book kit for a drawing game which includes a book and a pen. The book includes a front cover page which has a series of holes located along one corresponding edge thereof, and a back cover page which has a series of holes located along one edge thereof. Such edge corresponding to said edge of the front cover page. There are at least four internal pages located between the front cover page and the back cover page. The at least four internal pages each have a series of holes located along one edge thereof. Such edges corresponding to said edges of the front cover page. The at least four internal pages are transparent internal pages alternated with non-transparent internal pages. One side of each of the non-transparent internal pages contains a photograph or print of clouds in the sky. A pocket is located on the internal face of the back cover page. There is a binder for holding the pages together. Any suitable binder can be used. In one form, the binder is a spiral wire (such as in a spiral notebook) which goes through corresponding holes in the edge of the pages. Also the binder can have flexible pliable prongs which extend through the holes along the side of the front cover page, the back cover page and the internal pages; such binder has a lateral cross-section which is round; and such binder has a central longitudinal passageway. Binders can be used which do not use holes in the edges of the hole pages. The book can be hardback bound. The pen can be inserted at least partially into the central longitudinal passageway of the binder or it can be otherwise packaged with the book in, for example, (heat) shrink wrapping or other suitable packaging material. The pen can be used to write on the transparent pages of the internal pages whereby outlines can be drawn of animate and inanimate objects observed or perceived to be in the clouds shown on the adjacent, facing side of one of the printed pages.

Preferably one or more (for example, ten) loose transparent pages or clear (translucent) paper sheets are provided in the pocket located in the internal face of the back page. Each of the loose transparent/clear paper sheets can be used to transfer there onto the drawn or prepared object outline on one of the transparent internal page by means of drawing with the pen when the transparent/translucent paper sheet is overlaid on the internal page. The outlined object on the transparent/translucent paper sheet can then be colored using colored inks, acrylic paints or the like. The loose transparent/translucent sheets are for tracing over the photos of clouds in the book or clouds in the sky when placed on a car window, a home window, a plane window, etc. Preferably the pen contains nontoxic ink which can be used to draw on the transparent internal pages and the transparent/clear paper sheets, and which can be removed by rubbing with a water wetted pliable substance, cloth or the like. The front and back covers preferably are a glossy card stock or are part of a hardbound cover. The book can have a front transparent sheet located outside of the front cover page and a back transparent sheet located outside of the back cover page. Preferably at least one of the transparent internal pages has an inked or printed outline of the animate or inanimate object observed in the clouds of the photograph or print on the facing page of the non-transparent internal page.

The invention also includes a process of using the book kit of the invention to draw on one of the transparent internal page an outline of the animate or inanimate object observed in the clouds of the photograph or print on the facing page of the non-transparent internal page.

The invention also includes the book of the book kit of the invention. An instructional page(s) can be included in the book (e.g., after the front cover or title page). Instead of using the ink pen of the invention book kit, any other suitable drawing object (e.g., an ink marker or a crayon or a grease pen) can be used to draw the outline of the object in the clouds or transfer the outline to the clear or transparent paper sheet.

The invention further involves a set of flash cards which includes at least two flash cards. Each flash card contains (a) a photograph or print of clouds are one side and (b) the same photograph or print of clouds on the other side, with photograph or print (b) also having an outline of animate or inanimate object or objects observed to be in the clouds in photograph or print (b). A transparent covering can be located on each side of each of the flash cards, but preferably the flash cards are printed on a glossy card stock. Preferably the flash cards each have a hole in a corresponding corner, and an openable ring binder which is inserted through the corner holes.

The invention also includes a process of using the set of flash cards of the invention to learn how to observe or perceive an animate or inanimate objects, and their outlines, in the clouds of the photograph or print on flash cards.

BRIEF DESCRIPTION OF THE DRAWINGS

In the drawings:

FIG. 4 is a front elevational view of the book of FIG. 1 opened to one portion;

FIG. 5 is a front elevational view of the book of FIG. 1 opened to another portion with the outline page shown;

FIG. 8 is a perspective view of another open embodiment of the invention book opened to one portion;

FIG. 9 is a partial elevational view of the book of FIG. 8;

DETAILED DESCRIPTION OF THE INVENTION

Figure 1:
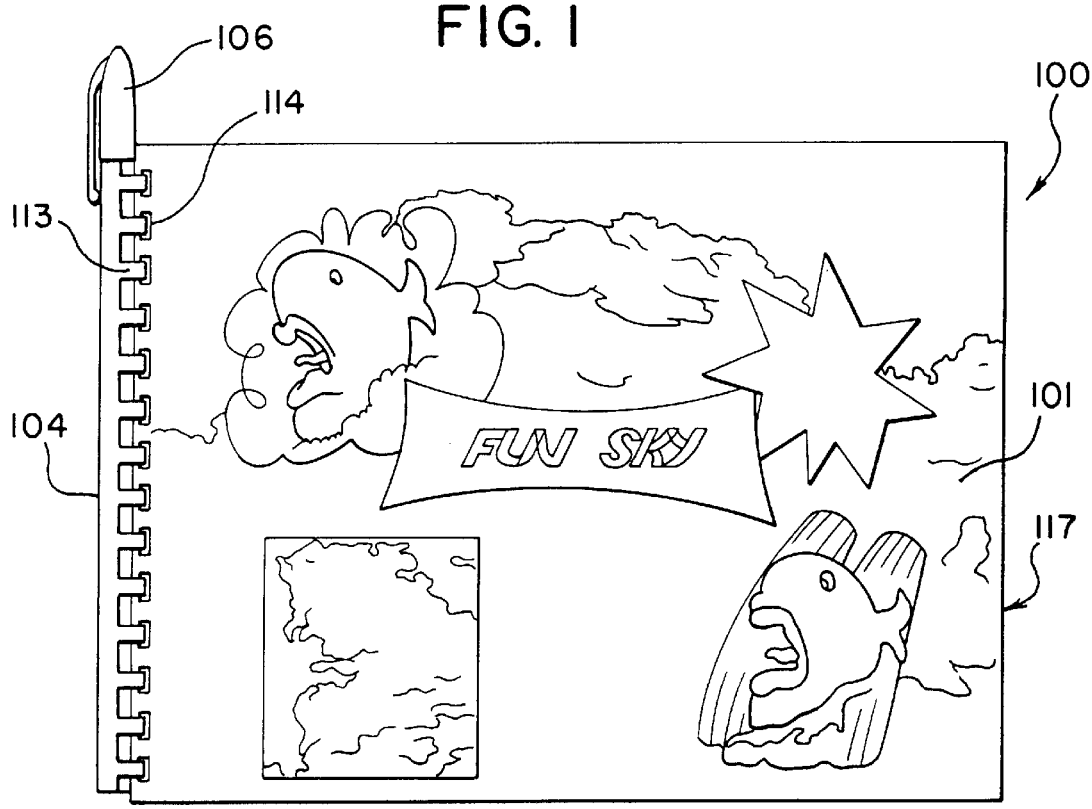
FIG. 1 is a front elevation view of the book kit of the invention.
Figure 2:
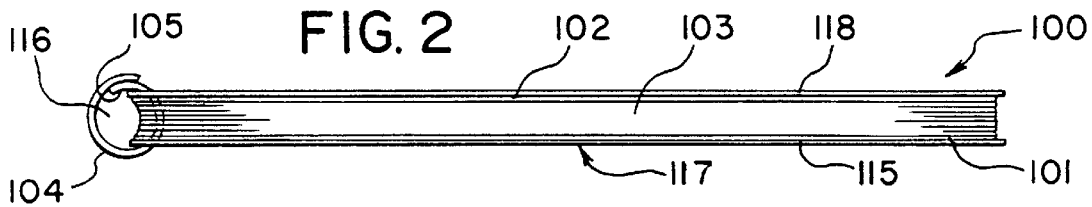
FIG. 2 is a top elevational view of the book of the book kit of FIG. 1.
Figure 3:
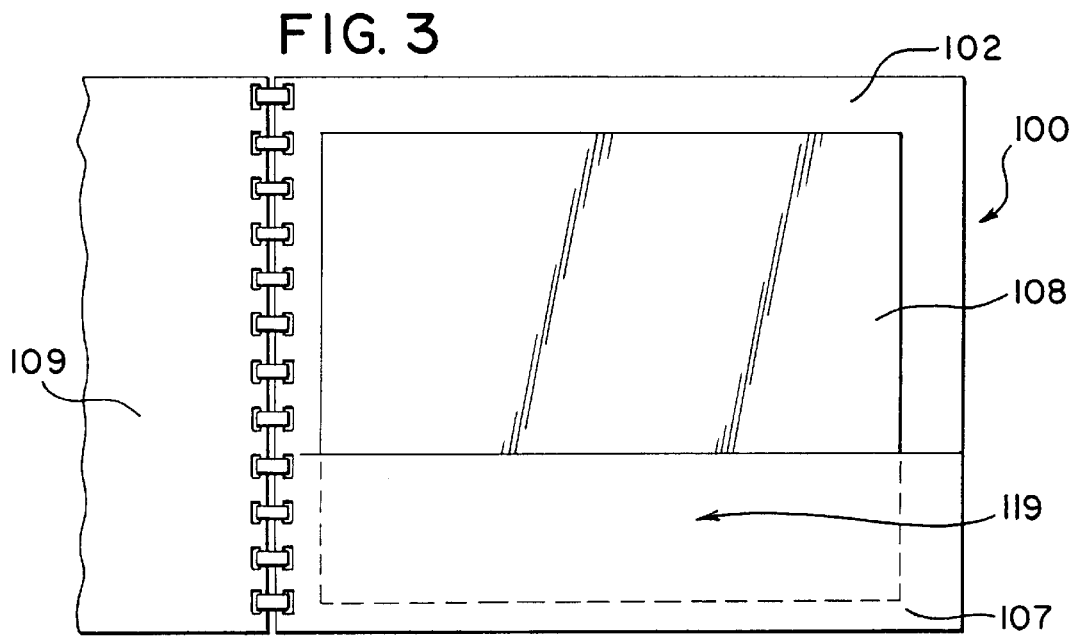
FIG. 3 is front elevational view of the book of the FIG. 2 open to show the pocket of the back cover.

In FIG. 1, book kit 100 has book 117 and ink pen 106. Book 117 has its pages (e.g. front cover page 101) held together by binder 104 with binder prongs 113 extending through holes 114 in the pages of book 117. Transparent front page 115 is located in front of front cover page 101. Ink pen 106 can be inserted probably into central longitudinal passageway 116 of binder 104 to store ink pen 106. Pictures, wording, etc., on the front surface of front cover page 101 show through transparent front page 115. Looking down on book 117, as shown in FIG. 2, pages 103 are located between front cover page 101 and back cover page 102, with optional transparent front page 115 and optional transparent back page 118 also being shown. As shown binder 104 has a cylindrical shape with central longitudinal passageway 116. Flexible prongs 105 of binder 104 extend through edge holes 114 of the pages of book 117. Prongs 105 curve around and fit inside of the body of binder 104. Book 117, of course, preferably has binding or a binder used by a professional printer. Bottom pocket 119 on the inside surface of back cover page 102 is formed by partial sheet 107. See FIG. 3. Transparent or clear (translucent) paper sheets 108 are stored in bottom pocket 119.

In FIG. 4, book 117 is open showing the front of a kit page 109 containing a photograph or print 111 of the sky containing cloud(s) 121, and the back side of a preceding page 109. A transparent page 110 overlies first page 109. The outline (shown in dotted line 120) of an observed object in the clouds in photograph 111 can be inked in by means of ink pen 106. A clear sheet 108 can then be placed on top of transparent page 110 and the object outline transferred onto sheet 108 by drawing it with ink pen 106 following the underlying object outline (120) on transparent page 110.

Figure 6:
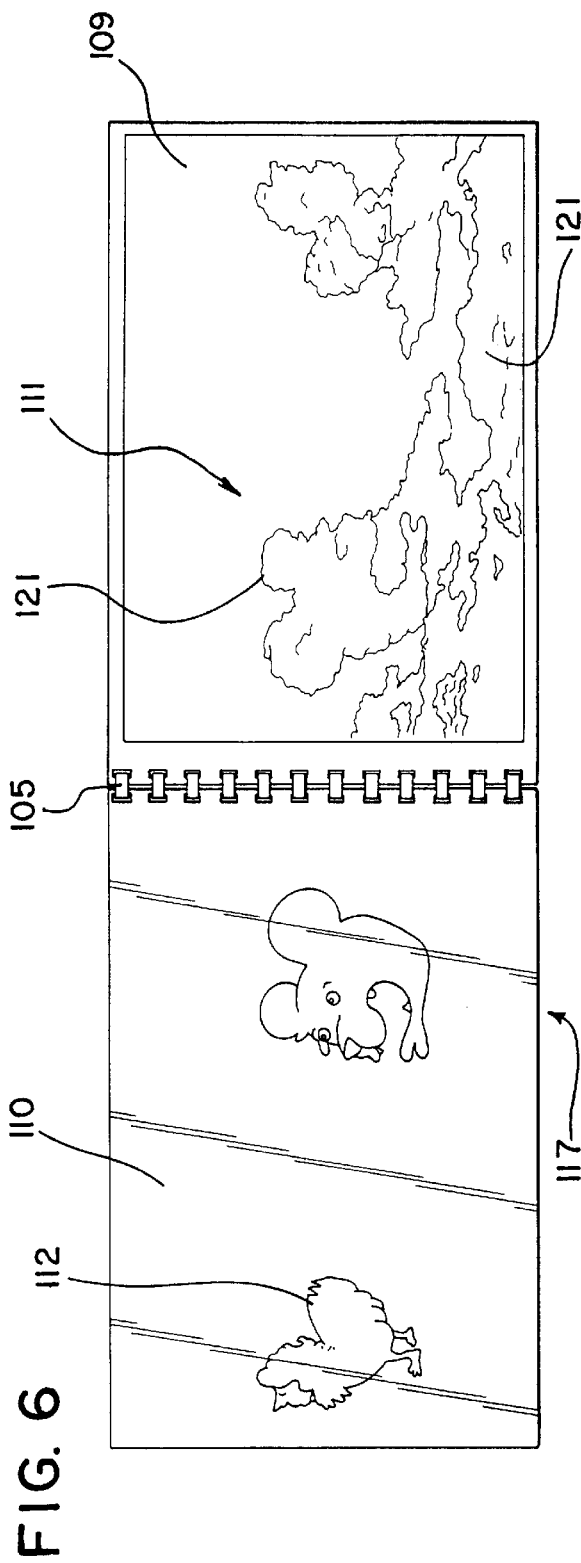
FIG. 6 is a front elevational view of the open book of FIG. 5 showing the outline page in another position.
Figure 7:
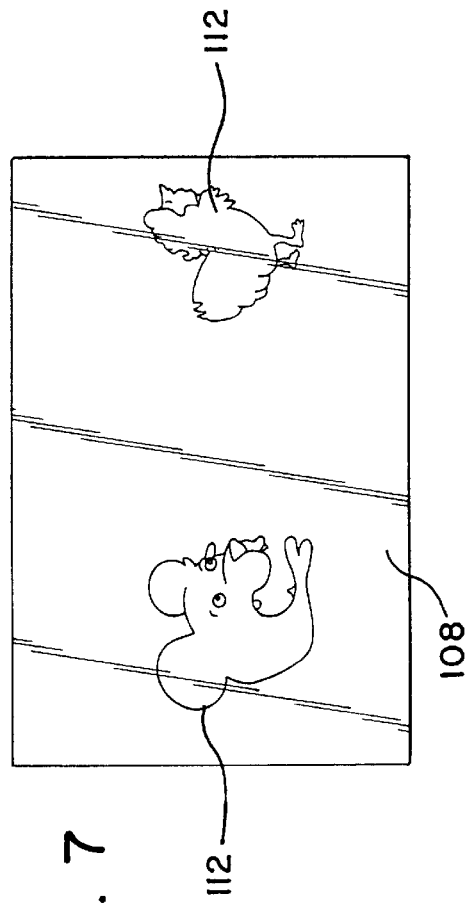
FIG. 7 is a front elevational view of one of the clear paper pages with the object outline drawn thereon.

In FIG. 5, book 117 is open showing the front of a first page 109 containing a photograph or print 110 of the sky containing a photograph or print 110 of the sky containing cloud(s) 121, and the back side of a preceding page 109. A transparent page 110 overlies first page 109. Outline 112 is preprinted on transparent page 110. Outline 112 is an outline of an object observed in clouds 121 of photograph 111 on first page 109. Outline 112 used to illustrate how to observe or perceive objects in clouds. FIG. 6 shows the back of transparent 112 (having been turned over to the right) with the reverse image of outline 112. In this manner one can first look at clouds 111 on first page 109 and practice trying to observe or perceive an object in clouds 111. To check ones observation, outline page 110 can be turned back over onto first page 109. (That is, FIG. 6 configuration followed by FIG. 5 configuration.) A clear sheet 108 can then be placed on top of clear page 110 and the object outline transferred onto sheet 108 by drawing it with ink pen 106 following the underlying object outline 120 on page 110. FIG. 7 shows clear sheet 108 with drawn object outline 112 thereon.

In FIG. 8, another version of pages to use in book 117 is shown. Book 117 has its pages held together by metal spiral 130—see FIG. 9. Right hand page 109 contains a photograph on print 111 of the sky containing clouds 121. Transparent page 110 contains outline 112 of the perceived object observed in clouds 121. The left hand page 109 contains an acrylic painting of the observed object 131 in clouds 121 and is a mirror image of the observed object in the photo on the right hand page 109. Outline 112 on transparent 110 fits either page's image. This version allows the child to look at paintings of the observed objects.

Preferably book 117 alternates the embodiments of FIGS. 4/5 and FIGS. 6/7. This arrangement alternates a sample by the artist, to the following page for a child's turn to draw, to the next page; a sample by the artist, and so on. A child can use the clear sheets to redesign or redraw the artist's samples. Book 117 typically contains 24 photos of clouds, 12 samples by the artist, 5 color paintings only by the artist (see FIG. 8), 10 loose clear pages and 12 (spiral) bound clear pages. There is typically one marker.

Figure 10:
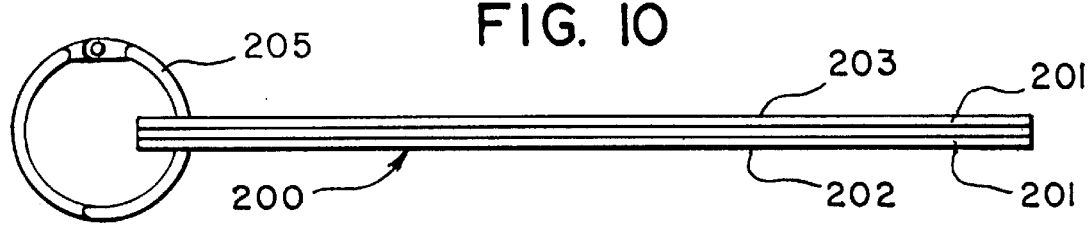
FIG. 10 is a top elevational view of a set of the flash cards of the invention.
Figure 11:
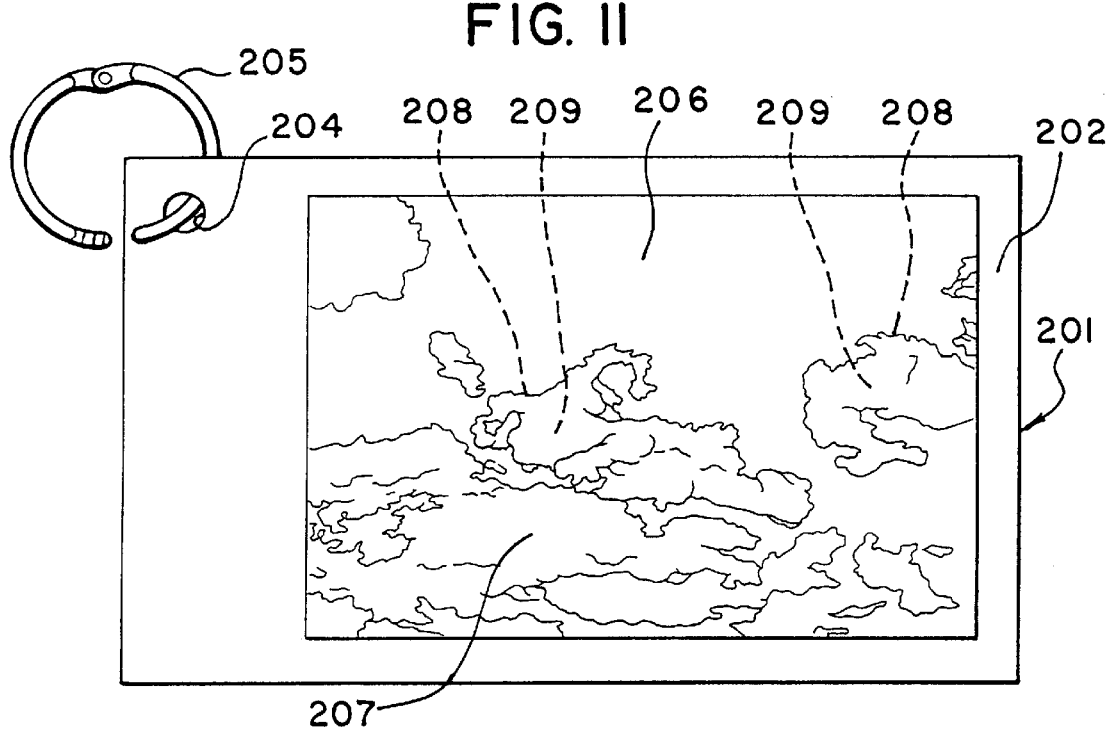
FIG. 11 is a front view of one of the flash cards of the invention.
Figure 12:
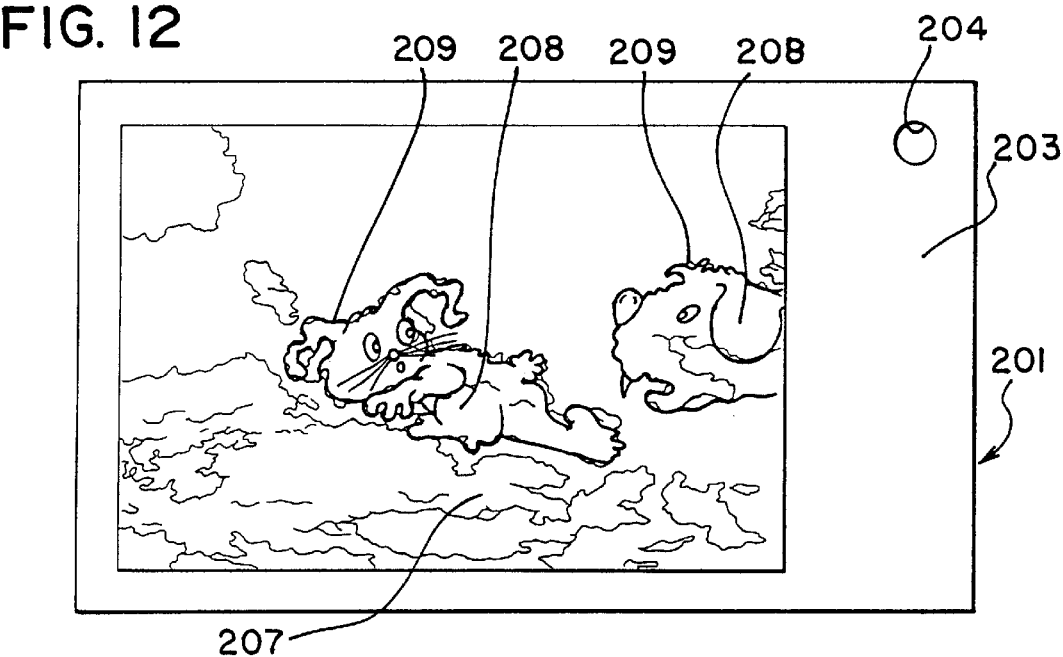
FIG. 12 is a back view of the flash cards FIG. 11.

In FIG. 10, set 200 of flash cards 201 is shown. FIG. 11 shows front side 202 of flash card 201, and FIG. 12 shown back side 203 of flash card 201. Openable ring binder 205 is inserted through holes 204 on flash cards 201. (Other openable or nonoperable binders can be used which allow the separating of flash cards 201 so that the front and back sides of individual flash cards can be easily seen.) Front side 202 contains a photograph or print of clouds 207 in the sky. One can look at clouds 207 to practice observing or perceiving an animate or inanimate object (209, shown in dotted lines 208). Back side 203 contains the same photograph or print of clouds 207 in the sky and an inked or printed outline 208 of the observed or perceived object 209. Back side 203 has photograph or print of clouds 207 muted or dimmed digitally to be able to more easily see black line 208. The use of flash cards 201 allows one to practice observing objects in clouds and photographs/prints thereof.

The disclosure of Provisional Application No. 60/068,752 filed on Dec. 24, 1997, entitled "Device And Process For Drawing Game", is incorporated herein by reference, and the benefit of such provisional application is hereby claimed.

What is claimed is:

1. A process of conducting a drawing game using a book, the book comprising (i) a front cover page, (ii) a back cover page, and (iii) at least four internal pages located between the front cover page and the back cover page, the at least four internal pages being transparent internal pages alternated with non-transparent internal pages, one side of the non-transparent internal pages containing a photograph or print of clouds in the sky, the process comprising:

(a) overlaying one of the non-transparent internal pages containing a photograph or print of clouds in the sky on a side of said non-transparent internal page with the transparent internal page adjacent to said side of said non-transparent internal page, and (b) drawing on the adjacent transparent internal page an outline of an animate or inanimate object observed or perceived to be in the clouds on adjacent, facing side of said non-transparent internal page.

2. The process according to claim 1, wherein a transparent or translucent paper sheet is overlaid the transparent internal page upon which the outline of the animate or inanimate object in the clouds had been drawn, and the drawn outline on the transparent internal page is transferred onto the transparent or translucent page by means of drawing thereon the underlying drawn outline on the transparent internal page.

3. The process according to claim 2 wherein the outlined object drawn on the transparent or translucent paper sheet is colored by means of paint or ink.

4. A process of conducting an educational exercise using a book, the book comprising:

(i) a front cover page, (ii) a back cover page, and (iii) at least four internal pages located between the front cover page and the back cover page, the at least four internal pages being transparent internal pages alternated with non-transparent internal pages, one side of the non-transparent internal pages containing a photograph or print of clouds in the sky, at least one of the non-transparent internal pages, which is located on the opposite side of the other non-transparent internal page facing the transparent internal page, contains a reverse image of the clouds with a colored reverse image of the outlined object, the process comprising:

(a) overlaying one of the non-transparent internal pages containing a photograph or print of clouds in the sky on a side of said non-transparent internal page with the transparent internal page adjacent to said side of said non-transparent internal page, (b) drawing on the adjacent transparent internal page an outline of an animate or inanimate object observed or perceived to be in the clouds on adjacent, facing side of said non-transparent internal page, and (c) overlaying the reverse of the outlined object drawn by the transparent internal page on the colored reverse image of the outlined object on the other non-transparent internal page and comparing the reverse image of the outlined drawn object with the colored reverse image of the outlined object.

5. A process of conducting an educational exercise using a book, the book comprising:

(i) a front cover page, (ii) a back cover page, and (iii) at least four internal pages located between the front cover page and the back cover page, the at least four internal pages being transparent internal pages alternated with non-transparent internal pages, one side of the non-transparent internal pages containing a photograph or print of clouds in the sky, at least one of the transparent internal pages containing a preprinted outline of an animate or inanimate object observed or perceived to be in the clouds on the adjacent, facing side of said non-transparent internal page, the process comprising:

(a) overlaying the side of one of the non-transparent internal pages containing a photograph or print of clouds in the sky on a side of said non-transparent internal page with the transparent internal page, which contains the preprinted outline of the animate or inanimate object observed or perceived to be in the clouds on the adjacent, facing side of said non-transparent internal page, adjacent to said side of said non-transparent internal pages, and viewing said animate or inanimate object in said clouds on said side of said non-transparent internal page as outlined by said preprinted outline of said animate or inanimate object on said transparent page; and (b) overlaying the side of another of the non-transparent internal pages containing a photograph of clouds in the sky on a side of said non-transparent internal pages with the transparent internal page, which is without a preprinted outline of the animate or inanimate object observed or perceived to be in the clouds on the adjacent facing side of said non-transparent internal page, adjacent to said side of said non-transparent internal page, and drawing on the transparent internal page an outline of the animate or inanimate object observed or perceived to be in the clouds on the adjacent, facing side of said non-transparent internal page.

6. The process according to claim 5, wherein the preprinted outline of the object on a transparent or translucent paper consists of preprinted black printed line or lines.

* * * * *